US006795283B2

(12) United States Patent
Lisauskas et al.

(10) Patent No.: US 6,795,283 B2
(45) Date of Patent: Sep. 21, 2004

(54) ELECTRICALS PACKAGE INTEGRATING RUN CAPACITOR, MOTOR PROTECTOR AND MOTOR STARTER

(75) Inventors: Richard J. Lisauskas, Wrentham, MA (US); William R. LeBeau, Pawtucket, RI (US); Russell P. Brodeur, Franklin, MA (US)

(73) Assignee: Texas Instruments Incorporated, Dallas, TX (US)

( * ) Notice: Subject to any disclaimer, the term of this patent is extended or adjusted under 35 U.S.C. 154(b) by 369 days.

(21) Appl. No.: 10/113,742

(22) Filed: Apr. 1, 2002

(65) Prior Publication Data

US 2002/0154459 A1 Oct. 24, 2002

Related U.S. Application Data

(60) Provisional application No. 60/285,166, filed on Apr. 20, 2001.

(51) Int. Cl.[7] .................................................. H02H 5/04

(52) U.S. Cl. ........................................................ 361/23

(58) Field of Search ............................. 361/23, 24, 22, 361/25, 27; 310/68 C

(56) References Cited

U.S. PATENT DOCUMENTS

| | | | | |
|---|---|---|---|---|
| 4,701,824 A | * | 10/1987 | Beggs et al. | 361/24 |
| 4,862,306 A | | 8/1989 | Lisauskas | |
| 5,170,307 A | | 12/1992 | Nacewicz et al. | |
| 5,729,416 A | | 3/1998 | Renkes et al. | |
| 6,317,304 B1 | * | 11/2001 | De Campos | 361/22 |

FOREIGN PATENT DOCUMENTS

| | | |
|---|---|---|
| WO | PCT/BR 97/00061 | 10/1997 |

* cited by examiner

*Primary Examiner*—Stephen W. Jackson
*Assistant Examiner*—James Demakis
(74) *Attorney, Agent, or Firm*—Russell E. Baumann; Frederick J. Telecky, Jr.

(57) ABSTRACT

A combination electricals package (12, 32) particularly for use with fractional horsepower compressor motors for various appliances has a first recess formed in the package for receipt of a motor starter (14) and a second recess formed in the package for receipt of a run capacitor (16) potted therein and having capacitor leads (16*a*) connected to a capacitor lead connecting portion (20*e*, 20*e'*) of a connector (20, 20') also having a motor pin connecting portion (20*d*) and a motor starter connecting portion (20*b*). The capacitor lead connecting portion in a preferred embodiment includes spaced apart parallel extending rails to accommodate capacitor lead misalignment. In a modified embodiment the capacitor lead connecting portion includes quick connect receptacles for conventional capacitor quick connect terminals. The connectors are formed so that the same connector can be used in two opposite orientations for left and right connectors. The motor starter is a PTC element (14) which is thermally isolated from capacitor (16) to help ensure that the capacitor remains below its maximum use temperature. In one embodiment the package has a first housing member mounting the motor starter (14) and motor protector (18) and a second housing member mounting the run capacitor (16) encapsulated therein. In another embodiment the motor protector, motor starter and the run capacitor are all mounted in the same housing member which is provided with an enclosing lid (32*b*).

14 Claims, 7 Drawing Sheets

ELECTRICALS PACKAGE INTEGRATING RUN CAPACITOR, MOTOR PROTECTOR AND MOTOR STARTER

RELATED APPLICATIONS

Benefit is claimed under 35 U.S.C. Section 119(e) (1) of U.S. Provisional Application No. 60/285,166, filed Apr. 20, 2001.

FIELD OF THE INVENTION

This invention relates generally to motors and more particularly to electrical components used with certain motors such as fractional horsepower motors for use with appliance compressors and the like.

BACKGROUND OF THE INVENTION

It is conventional to mount a motor protector and motor starter in an electricals package for use with a compressor motor. Electrical connections are provided to allow attachment of a run capacitor connected as a separate component. The capacitor can be remotely mounted and connected by suitable leads or the package can be adapted for attachment of the capacitor directly onto the package utilizing a mounting post or the like, as seen for example in U.S. Pat. No. 5,170,307, assigned to the assignee of the present invention, the disclosure of which is incorporated herein by this reference. In either approach, the capacitor and electricals package are purchased as separate components and electrically connected by the appliance manufacturer.

The capacitive element of the run capacitor typically is a thin metallized polymer film which is wound in a coil or stacked in a multilayered structure to provide the needed electrical contact area. The polymer film is mounted in a plastic case and quick connects are attached to wire leads extending to the metallized polymer film which are encapsulated in the plastic case in order to meet industry life and reliability requirements.

The wire leads connected to the metallized polymer film tend to wander causing a change in the specific location of the quick connects. When a manufacturer of the appliance which incorporates a compressor using the electricals package attempts to plug the capacitor quick connects into the connections provided in the electricals package for direct attachment to the package, it is not uncommon for the capacitor quick connects to be out of alignment with the electricals package connectors. This problem is exacerbated by the large offset distance between the capacitor connector post and receptacles. The large offset is necessary to accommodate the wide range of run capacitor geometries for various device applications. This can cause interruptions in the assembly line resulting in lost time. With respect to the use of a discrete or remotely mounted capacitor, separate means must be provided to mount the capacitor using more and longer wire lead lines than desired.

SUMMARY OF THE INVENTION

It is an object of the invention to provide a simple, reliable and improved low cost apparatus and method for mounting and electrically connecting a run capacitor to an electricals package containing a motor starter and typically a motor protector. Another object of the invention is to provide an electricals package of the type described in U.S. Pat. No. 5,170,307, identified above, which more efficiently accommodates the run capacitor used with certain motors. Yet another object is the provision of an electricals package which simplifies the electrical connection scheme between a motor starter and a capacitor used therewith. Another object of the invention is to provide an electricals package for a motor starter and a motor protector which also accommodates a capacitor which is less expensive and easier to install by an appliance manufacturer than is the case for prior art devices. Yet another object of the invention is the provision of an apparatus and a method which overcomes the limitations of the prior art noted above.

Briefly, in accordance with the invention, first and second recesses are formed in the package with a motor starter received in the first recess and a run capacitor received and encapsulated in the second recess and with the motor starter thermally isolated from the capacitor and electrically connected to the motor starter terminals. In one preferred embodiment, the electricals package comprises first and second inter-engaging housing members with the first recess formed in the first housing member and the second recess formed in the second housing member. Electrical connection is preferably made to the capacitor through first and second integral connectors, each having a motor starter connecting portion, a motor pin connecting portion and a capacitor lead connecting portion. In one preferred embodiment, each capacitor lead connecting portion includes a pair of spaced apart, parallelly extending rails having a selected length adapted to receive therebetween a respective capacitor lead anywhere along the length of the rails to accommodate lead alignment variations. In another preferred embodiment, each capacitor lead connecting portion includes a quick connect receptacle terminal. According to a feature of the invention, both type of connectors are preferably provided with upper and lower, vertically aligned motor pin connecting portions and capacitor lead connecting portions so that a single connector structure can provide the same connector orientation on either side of the motor starter. The motor starter connecting portion, when used with a disc shaped element of positive temperature coefficient of resistivity (PTC) material, includes spring fingers adapted to be biased against a respective contact face of the element.

In an alternative embodiment, the electricals package comprises a single housing in which recesses are formed for reception of the motor starter and capacitor elements with a lid received over the housing. In all of the embodiments, the capacitor is an integral part of the electricals package rather than a separate component which results in requiring less plastic material than that of the prior art by obviating the need for a separate case and with the capacitor electrically connected to the motor starter terminals so that appliance assembly no longer includes the step of making electrical connections to the capacitor. In accordance with the invention, the electricals package can also serve as the electrical enclosure or terminal cover and is intended for use with fractional horsepower compressors used for refrigerator or related applications, such as dehumidifiers, vending machines and the like.

BRIEF DESCRIPTION OF THE DRAWINGS

Other objects, advantages and details of the novel and improved combinations electricals package appear in the following detailed description of preferred embodiments of the invention, the detailed description referring to the drawings in which.

DETAILED DESCRIPTION OF THE PREFERRED EMBODIMENTS

Figure 1:
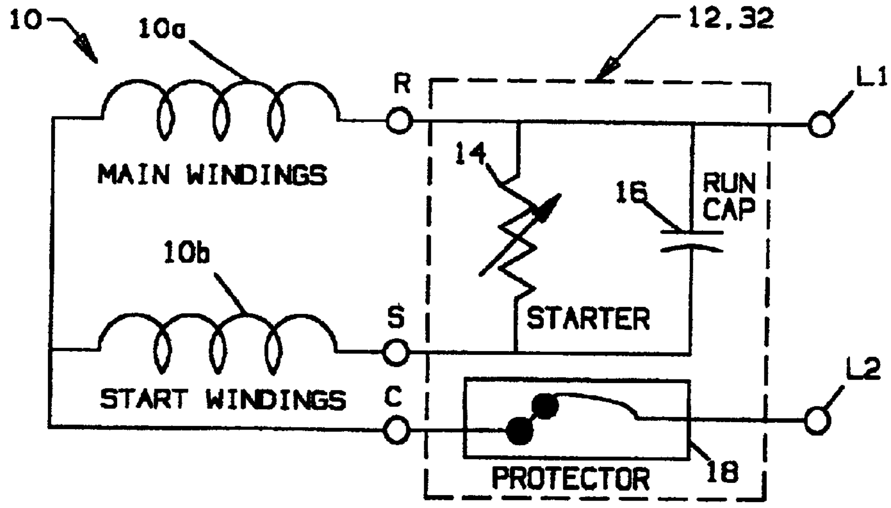
FIG. 1 is an electrical schematic of a motor and an electricals package having a motor starter, a motor protector and a run capacitor.

With reference to FIG. 1, an electric motor 10 is shown having a main winding 10*a*, a start winding 10*b* and terminals R, S and C. An electricals package 12 made in accordance with the invention includes a motor starting switch in the form of a positive temperature coefficient of resistivity (PTC) element 14 and run capacitor 16 electrically connected in parallel relationship with each other and in series with the start winding 10*b* and line terminal L1. Line terminal L1 is also connected to the main winding terminal R while line terminal L2 is connected to common motor terminal C through motor protector 18.

Figure 2:
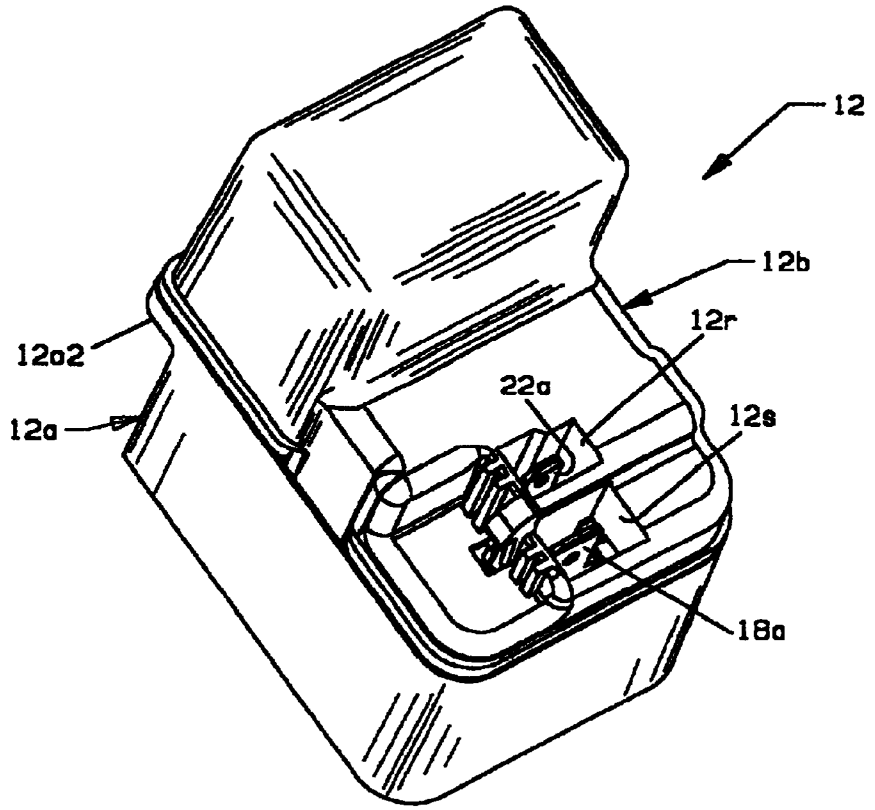
FIG. 2 is a perspective view of an electricals package taken from a position above the package comprising first and second inter-engaged housing members made in accordance with a first preferred embodiment of the invention for use with an electrical motor.
Figure 3:
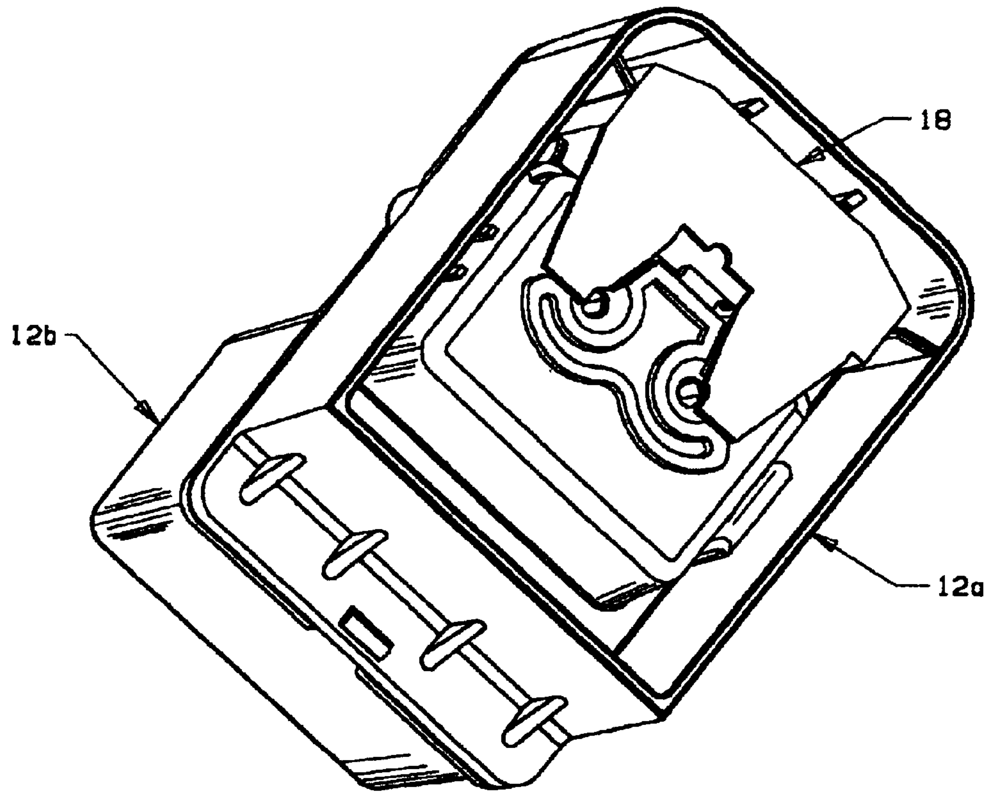
FIG. 3 is a perspective view of the FIG. 2 electricals package taken from a position below the package.
Figure 4:
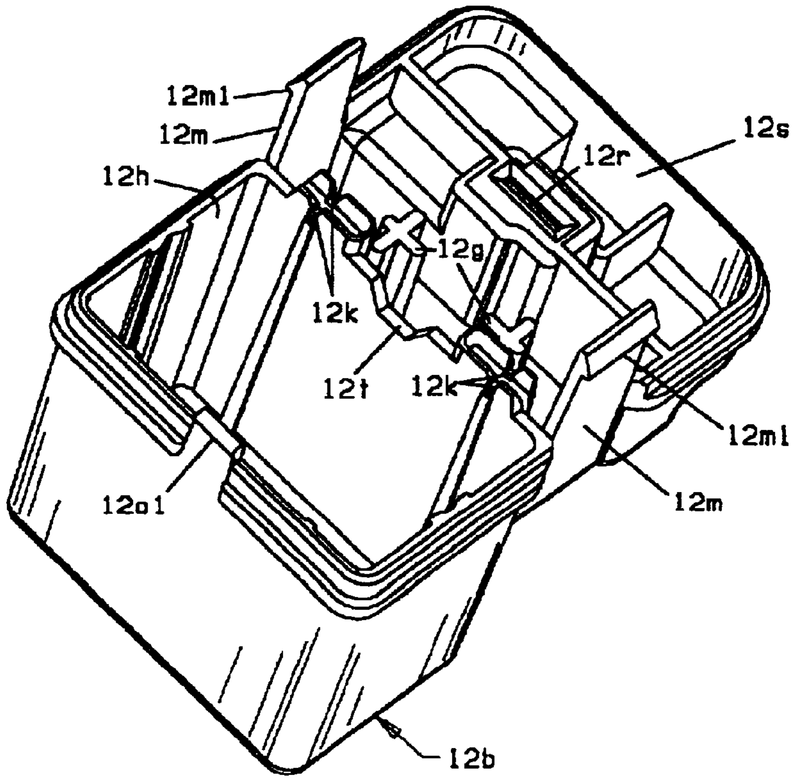
FIG. 4 is a perspective view of the second or upper housing member taken from a position below the member and prior to assembly of any components therein.
Figure 7:
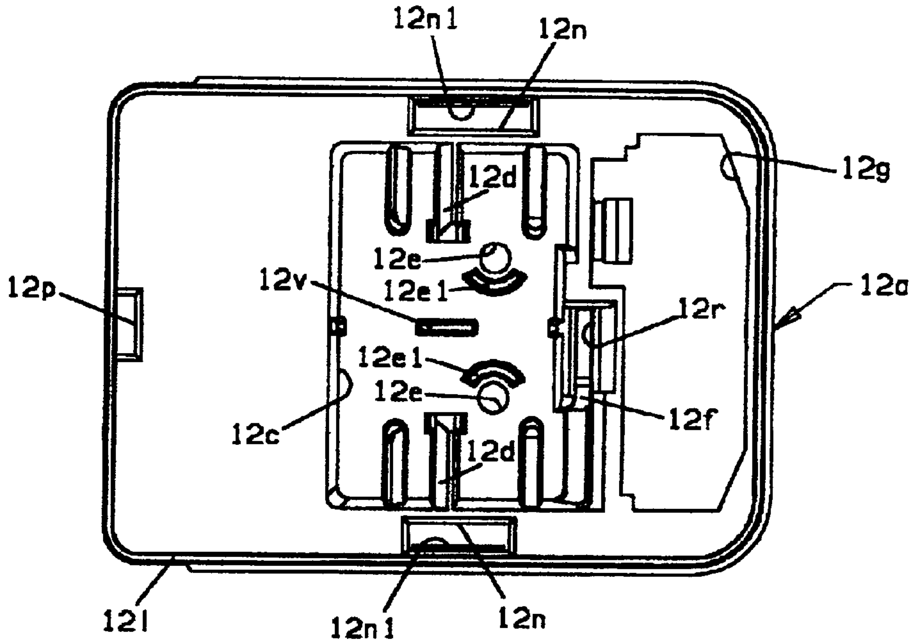
FIG. 7 is a top plan view of the first or lower housing member shown prior to assembly of any components therein.
Figure 8:
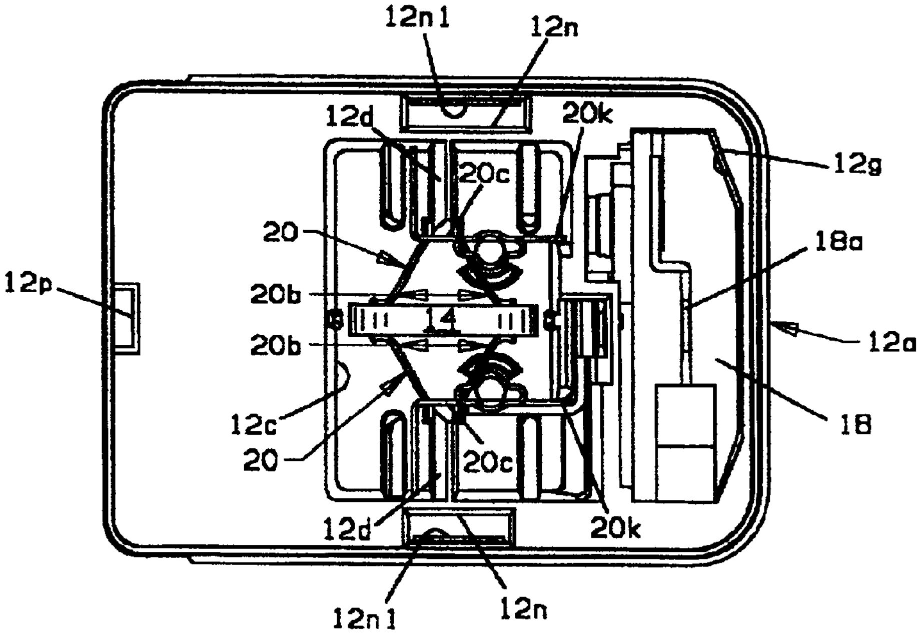
FIG. 8 is a view similar to FIG. 7 but shown with a motor starter and connectors received in a recess of the housing member and shown with a motor protector in an opening formed in the housing member.
Figure 9:
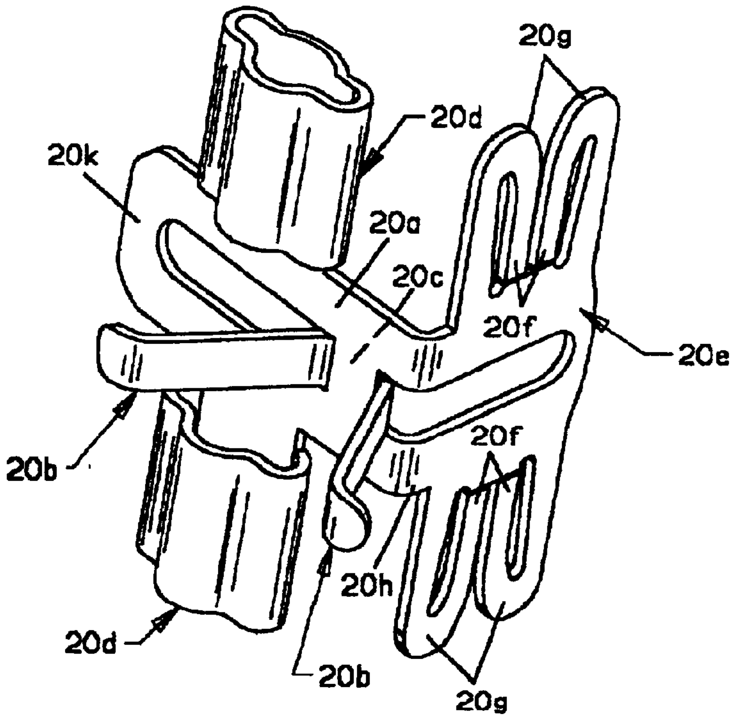
FIG. 9 is a perspective view of a connector used in the FIG. 2 electricals package.

With respect to FIGS. 2 and 3, a combination electricals package made in accordance with the first preferred embodiment of the invention comprises a first or lower housing member 12*a* (as shown in FIG. 2) inter-engaged with a second or upper housing member 12*b*. The housing members are formed of suitable electrically insulative plastic material. FIGS. 7 and 8, top plan views of the first housing member before and after components are received therein, shows a recess 12*c* formed therein in which a motor starting switch is received. Although various motor starting switches can be used within the purview of the invention, in accordance with the embodiment illustrated a disc shaped element 14 of positive coefficient of resistivity material having opposed face surfaces provided with an electrically conductive layer in a known manner is employed. Element 14 is essentially suspended out of engagement with the walls of the recess by means of connector fingers 20*b* of a connector to be described and best seen in FIGS. 9 and 11, along with a projection 12*v* formed in the bottom wall of the recess, to thereby provide thermal separation of the motor starter. This thermal isolation helps to ensure that the capacitor element remains below its maximum use temperature.

Connector 20 formed of suitable electrically conductive spring material has a body portion 20*a* from which fingers 20*b* are formed serving as a motor starting switch connecting portion. The face surface 20*c*, opposite the face surface from which spring fingers 20*b* extend, is placed against the end surface of a respective rib 12*d* which serves as a reaction member to provide selected contact force of the fingers against the contact surface of PTC element 14 when a corresponding connector 20 is placed on the opposite side of PTC element 14.

Connector 20 has a motor pin connecting portion 20*d* in the form of a pin receptacle and preferably has a pair of vertically aligned pin receptacles extending upwardly and downwardly, respectively from body portion 20*a*. This enables the same connector structure to be used for both face surfaces of PTC element 14 by turning a second connector over to provide a motor pin receptacle at the same location for both connector orientations.

Connector 20 also has a capacitor lead connecting portion 20*e* comprising spaced apart parallelly extending spring rails 20*f* having a selected length for a purpose to be described below. Again, preferably vertically aligned, upper and lower connecting rails 20*f* are formed to enable the use of a single connector body for both a right hand and a left hand connector. Body 20*a* is bent approximately 90 degrees at connecting portion 20*h* to orient the rails in a selected direction to accommodate capacitor leads, to be discussed in relation to FIG. 6.

Connectors 20 are received in recess 12*c* with an end portion 20*k* of body portion 20*a* at one side end of the recess so that motor pin connecting portions 20*d* are aligned with respective motor pin apertures 12*e* and guide ribs 12*e*1 formed in the bottom wall of recess 12*c* and with capacitor lead connecting portion 20*a* facing the side ends of the recess. Connectors 20 having the motor starter, motor pin and capacitor lead connecting portions are preferably integrally formed and with the latter two portions provided with upper and lower vertically aligned portions to enable the use of the connector in two opposite orientations as described above however, it will be understood that, if desired, separate connector portions can be provided.

Figure 10:
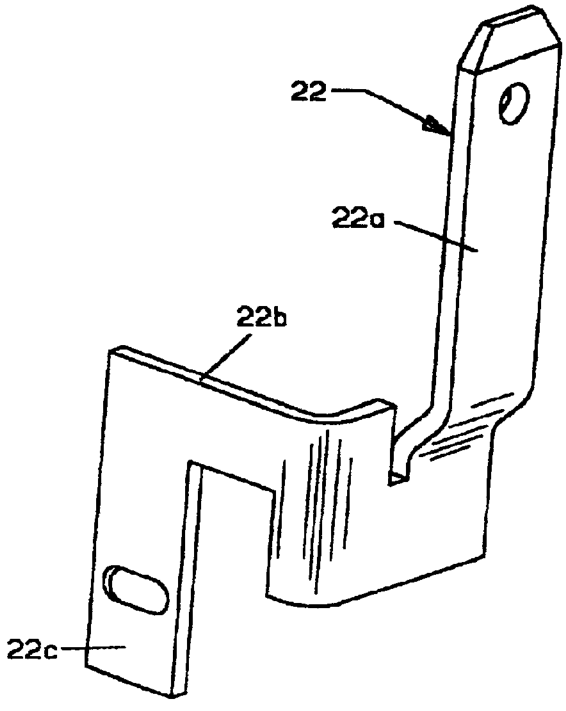
FIG. 10 is a perspective view of a terminal member used with a connector as shown in FIG. 9.
Figure 11:
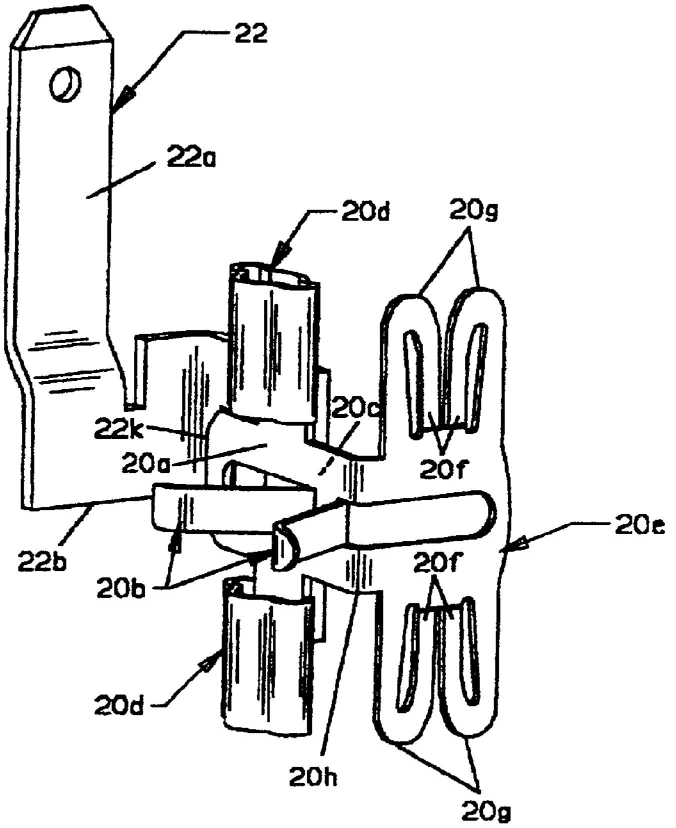
FIG. 11 is a perspective view of an assembly comprising a connector as shown in FIG. 9 and the terminal shown in FIG. 10.

Also shown in FIGS. 8, 10 and 11 is jumper terminal 22. Jumper terminal 22 has a bayonet blade terminal portion 22*a* for connection with line L1, a seating portion 22*b* received in a slot 12*f* and lower body portion 22*c* for connection to body 20*a* as by welding thereto in the vicinity of end 20*k*. It will be understood that any suitable means for connecting terminal 22 and connector 20 can be used, as desired.

Housing member 12*a* is also preferably provided with an opening 12*g* for receipt of a motor protector 18, such as that shown and described in U.S. Pat. No. 5,170,307, referenced supra. It will be understood that it is within the purview of the invention to provide an electricals package with only a motor starter 14 and capacitor 16, if desired.

Figure 5:
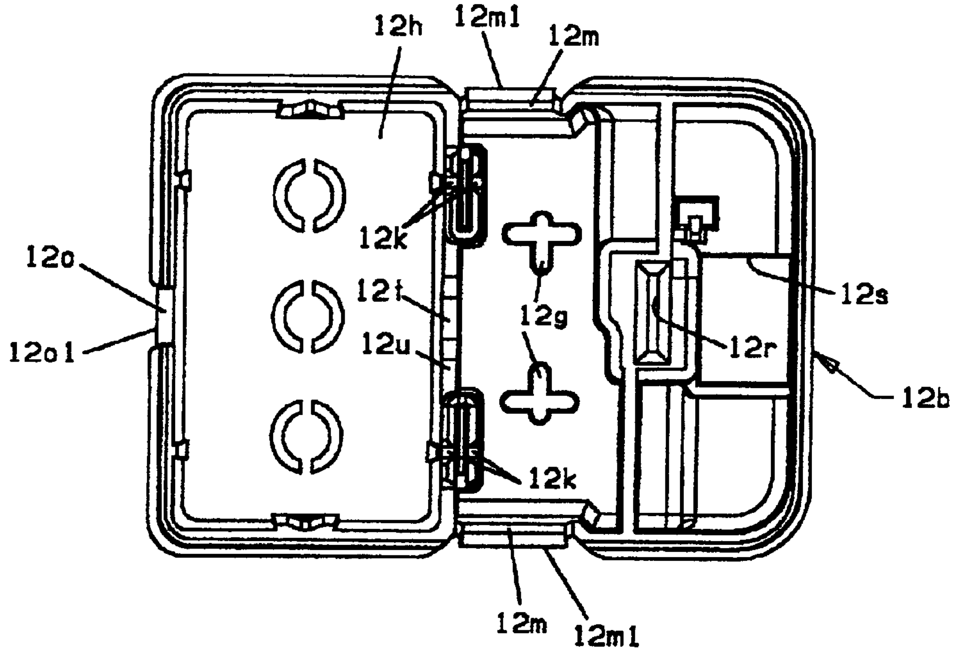
FIG. 5 is a bottom plan view of the second housing member shown in FIG. 4 with slightly modified wall portions forming the capacitor receiving recess.
Figure 6:
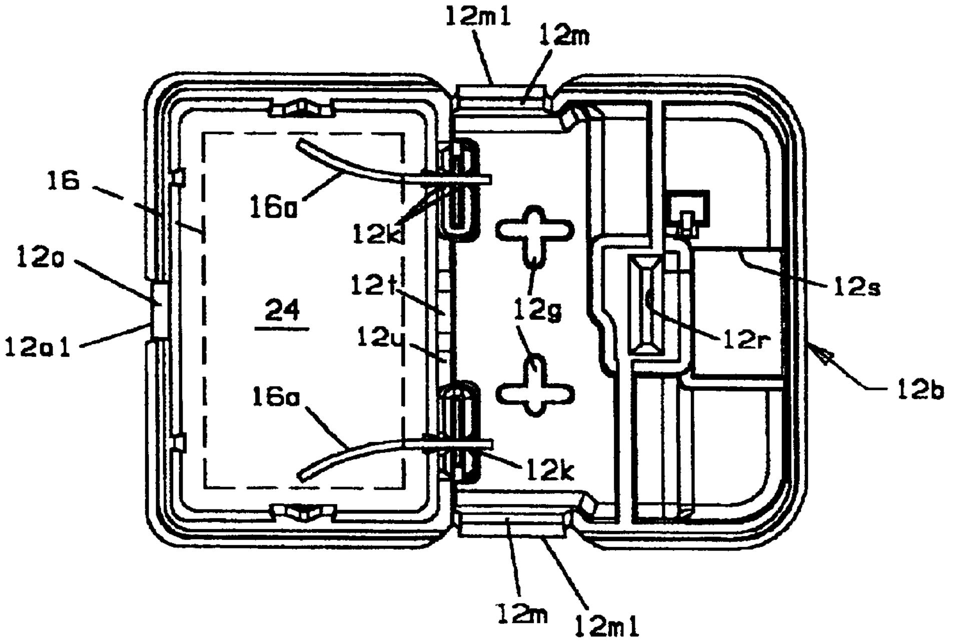
FIG. 6 is a view similar to FIG. 5 but shown with a capacitor received and encapsulated in the capacitor receiving recess of the housing member.

FIGS. 5 and 6 are bottom plan views of the upper housing member 12*b* relative to the orientation shown in FIG. 2 before and after receipt of a capacitor therein, respectively. Housing member 12*b* is formed with a recess 12*h* in which is received run capacitor 16 encapsulated in the recess with suitable potting material 24 to provide environmental protection. Capacitor leads 16*a* extend out of the encapsulant and are received through slots 12*k* in wall members of the housing member. The slots align the leads in a direction generally parallel to the plane in which body 20*a* of connectors 20 lie so that when the housing members are interconnected the leads will be received between rails 20*f* and forced into electrical engagement therewith at some location along the length of the rails, depending on their specific location. The entrance 20*g* of the rails is opened as by rounding to accommodate lateral misalignment. Thus, the wire leads extending from the capacitor 16 can easily be accommodated for electrical connection with capacitor lead connecting portions 20*e* even though the specific location can vary from one capacitor to another. Housing member 12*a* is provided with a peripherally, upwardly extending lip 12*l* to accurately receive within the periphery of the lip the outer periphery of housing member 12*b* and with upwardly extending arms 12*m* and 12*o* of housing member 12*b* received in slots 12*n*, 12*p*, respectively of housing member 12*a*. Arms 12*m*, 12*o* are preferably provided with locking tabs at their free distal ends 12*m*1, 12*o*1, respectively for inter-engagement with shelves 12*n*1 and wall portion 12*o*2 in wall members of housing member 12*a*.

Housing member 12*b* is shown with posts 12*q* extending upwardly from the closed end of the housing to serve as a stop surface for motor pin connecting portions 20*d*. Housing member 12*b* is also formed with a terminal slot 12*r* for receipt of jumper terminal blade portion 22*a* and opening 12*s* for receipt of motor protector terminal 18*a*. A slot 12*t* is formed in the outer central portion of wall 12*u* to provide clearance for PTC element 14 when the housing members are connected together.

Figure 12:
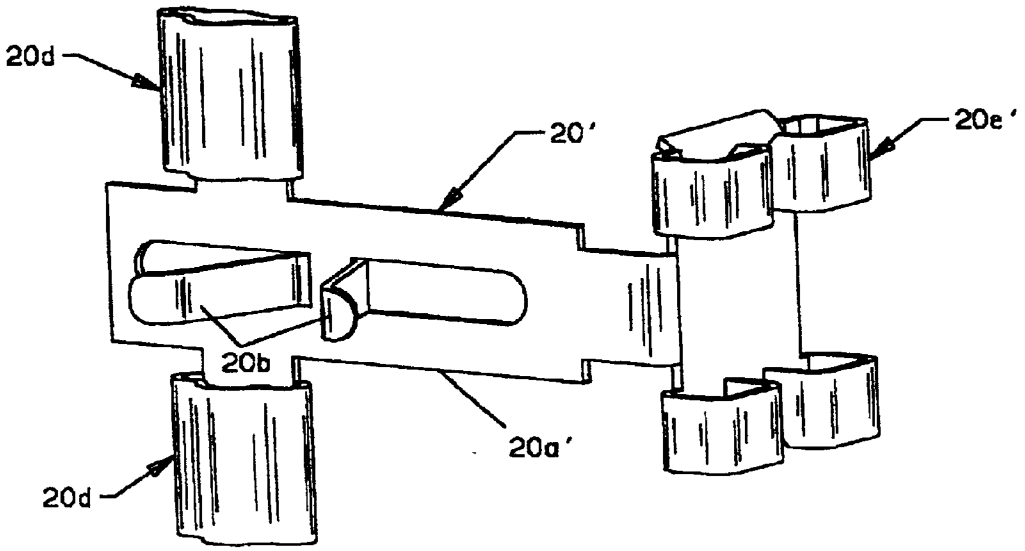
FIG. 12 is a perspective view of a modified connector.
Figure 13:
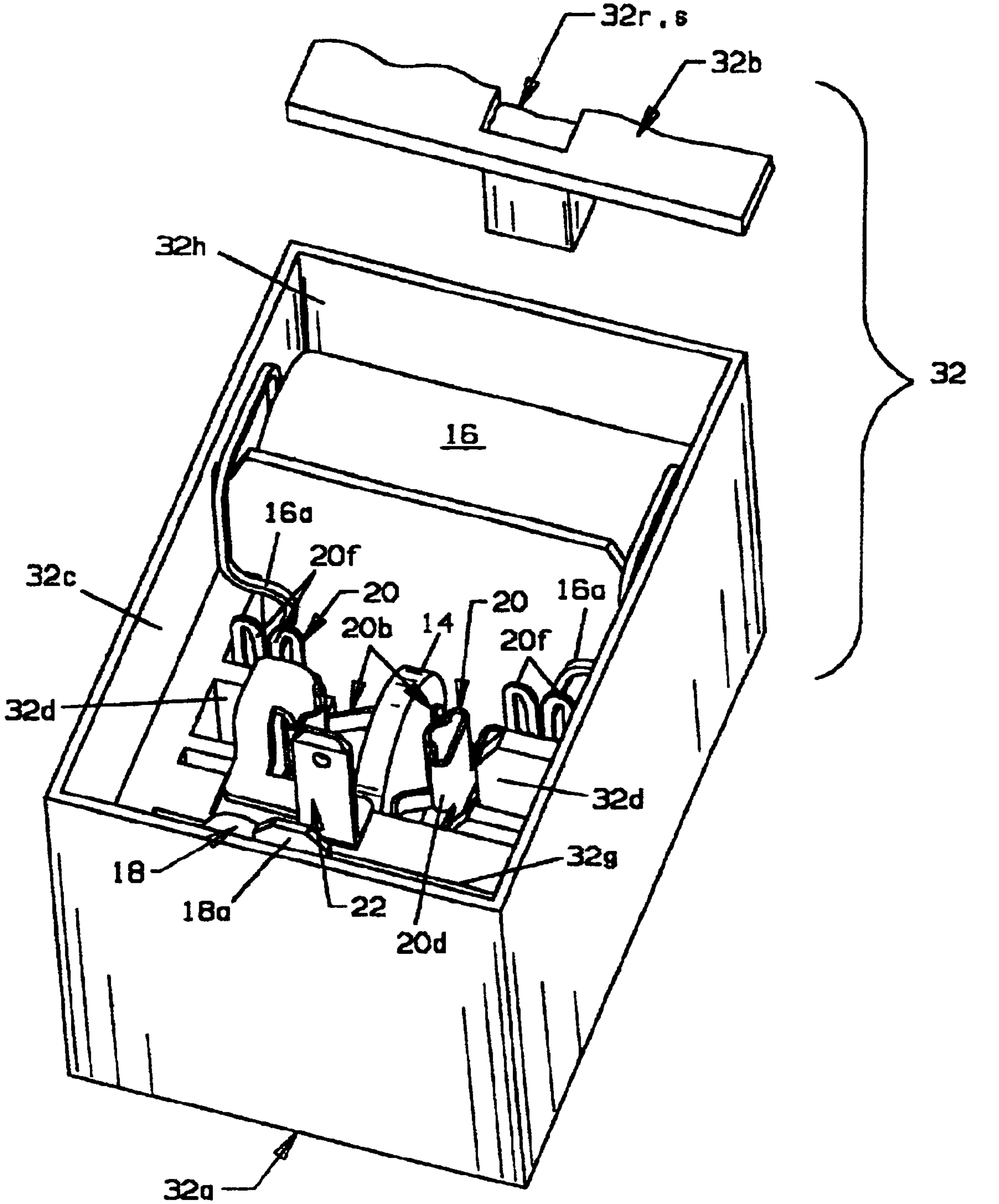
FIG. 13 is a perspective view of another preferred embodiment of the invention shown with one housing member broken away and separated from a second housing member.

FIG. 12 shows a modified connector 20' which is similar to connector 20 except for capacitor lead connecting portion 20*e*' which is formed with vertically aligned upper and lower quick connect receptacles for electrical connection with conventional capacitor quick connect terminals for connection therewith. Problems of misalignment between the quick connect terminals and receptacles are minimized due to the fixed alignment between the first and second housing members of the combination electricals package and also due to the single size of the capacitor housing contained within the housing member of the package.

In another preferred embodiment, a combination electricals package 32 comprises a first housing member 32*a* in which a first recess 32*c* receives motor starter PTC element 14 along with connectors 20, which can be the same as those employed in the previously described embodiment, which cooperate with ribs 32*d* to provide a reaction surface for spring contact fingers 20*b* against PTC element 14 and a second recess 32*h* which receives capacitor 16, shown in the figure prior to being encapsulated in the recess. The distal free end portions of capacitor leads 16*a* are shown received between parallel extending, spaced apart rails 20*f* as in the previously described embodiment. An opening 32*g* may be provided in housing member 32*a* for receipt of motor protector 18, again as described above with reference to the first embodiment. A second housing member 32*b* in the form of a lid is receivable over the open end of housing 32*a* to enclose the recesses. Lid housing member 32*b* is provided with a suitable terminal receiving portion 32*r, s* for providing access to terminals 18*a*, 22*a*.

By assembling the capacitor as part of the combination electricals package and no longer as an independent component, a lower installed cost to the appliance manufacturer is provided. Such lower cost results from several factors, including use of a housing member of the electricals package as the capacitor cover thereby eliminating the need for a separate capacitor plastic case; elimination of the need for the appliance manufacturer to attach the capacitor to the electricals package thereby saving manufacturing labor as well as wire costs in the case of remotely mounted applications; simplification of the connection scheme between the starter and the capacitor; and the protector may assist in the fail-safe open safety requirement for the capacitor element and may even reduce cost of the element.

It will be understood that the invention includes all modifications and equivalents of the described embodiments falling within the scope of the appended claims.

What is claimed:

1. A package for mounting electrical components used with an electrical motor comprising:

a first housing member formed of electrically insulative material having an open end with a recess formed therein, a motor starter received in the recess, first and second spaced apart connectors received in the recess, each connector having a motor pin connecting portion, a capacitor lead connecting portion and a motor starter connecting portion received in the first recess, the motor starter connecting portions electrically connected to the motor starter, the first housing member having motor pin receiving apertures, a second housing member formed of electrically insulative material having an open end with a recess formed therein, a capacitor received and potted in the recess of the second housing member, the capacitor having first and second leads extending out of the potting material, the second housing member received on the first housing member closing the open ends thereof, the first and second capacitor leads electrically connected to the respective capacitor lead connecting portion of the first and second connectors with the capacitor thermally isolated from the motor starter, and the second housing member having power terminal receiving apertures formed therein.

2. A package according to claim 1 in which the motor starter comprises a disc shaped element of positive temperature coefficient of resistivity material having generally parallel, spaced apart contact faces and the motor starter connector portions comprise spring fingers biased against respective faces of the disc shaped element making electrical connection therewith and mounting the element essentially thermally isolated from the first housing member.

3. A package according to claim 2 in which the first and second connectors are identical with one another, each having a body portion from which the spring fingers extend, an upper and a lower aligned motor pin receptacle extending from one portion of the body and an upper and a lower aligned capacitor lead connector extending from another portion of each connector so that one connector can be mounted in the first housing in one orientation on one face side of the disk shaped element and the second connector can be mounted in a second orientation on the opposite face side of the disc shaped element with the motor pin receptacles aligned with respective motor pin apertures in the first housing member and the capacitor lead portions aligned with respective capacitor leads in the second housing member.

4. A package according to claim 3 in which the capacitor lead connector portions each comprise spaced apart, parallel extending, aligned spring rails for receiving a respective capacitor lead between the rails anywhere along the length of the rails to allow for mis-alignment of the respective capacitor lead.

5. A package according to claim 2 in which the capacitor lead connector portions each comprise spaced apart, parallel extending, aligned spring rails for receiving a respective capacitor lead between the rails anywhere along the length of the rails to allow for mis-alignment of the respective capacitor lead.

6. A package according to claim 1 in which an opening is formed through the first housing member and a motor protector is received in the opening, the motor protector having a motor pin connector and a power terminal, the power terminal extending through a power terminal aperture of the second housing.

7. A package for mounting electrical components used with an electrical motor comprising:

a motor starting switch comprising a disc shaped element of positive temperature coefficient of resistivity material received in the package, first and second spaced apart connectors mounted in the package, each connector having spring fingers biased into engagement with the disc shaped element and having a capacitor lead connecting portion, the package formed with motor pin receiving apertures, a capacitor received and potted in the package thermally isolated from the motor starting switch, the capacitor having first and second leads extending out of the potting material, the first and second capacitor leads electrically connected to the respective capacitor lead connecting portion of the first and second connectors and the package having power terminal receiving apertures formed therein.

8. A package according to claim 7 in which the spring fingers mount the disc shaped element essentially thermally isolated from the capacitor.

9. A package according to claim 8 in which the package comprises first and second housing members, each housing member formed with a recess, the motor starting switch received in the recess of the first housing member and the capacitor received and potted in the recess of the second housing member.

10. A package according to claim 9 in which each capacitor lead connecting portion comprises spaced apart parallel extending rails having a selected length for receipt therebetween of a respective capacitor lead at any location along the length of the rails.

11. A package according to claim 9 in which each capacitor lead connecting portion comprises a quick connect receptacle.

12. A package according to claim 8 in which the package comprises a housing with first and second recess formed therein, the motor starting switch received in the first recess and the capacitor received and potted in the second recess, and a lid is received over the recesses.

13. The method of constructing a motor starter for fractional horsepower electrical motors comprising the steps of forming a package having walls of electrically insulative material and forming a motor starting recess and a capacitor receiving recess in the package, mounting a motor starting switch in the motor starting recess of the package thermally separated from the walls of the package, mounting a capacitor in the capacitor receiving recess, and electrically connecting the capacitor in parallel relationship with the motor starting switch.

14. The method of claim 13 in which the motor starting switch comprises a disc shaped element of positive temperature coefficient of resistivity material.

* * * * *